United States Patent
Mori et al.

(10) Patent No.: US 10,160,064 B2
(45) Date of Patent: Dec. 25, 2018

(54) FLUX, SOLDER PASTE AND SOLDER JOINT

(71) Applicant: Senju Metal Industry Co., Ltd., Tokyo (JP)

(72) Inventors: Hideki Mori, Tochigi (JP); Kazuya Kitazawa, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 356 days.

(21) Appl. No.: 14/911,515

(22) PCT Filed: Aug. 12, 2013

(86) PCT No.: PCT/JP2013/071779
§ 371 (c)(1),
(2) Date: Feb. 11, 2016

(87) PCT Pub. No.: WO2015/022719
PCT Pub. Date: Feb. 19, 2015

(65) Prior Publication Data
US 2016/0184936 A1    Jun. 30, 2016

(51) Int. Cl.
*B23K 35/362* (2006.01)
*B23K 35/02* (2006.01)
*B23K 35/36* (2006.01)

(52) U.S. Cl.
CPC .......... *B23K 35/362* (2013.01); *B23K 35/025* (2013.01); *B23K 35/0222* (2013.01); *B23K 35/0244* (2013.01); *B23K 35/36* (2013.01); *B23K 35/3612* (2013.01); *B23K 35/3613* (2013.01); *B23K 35/3618* (2013.01)

(58) Field of Classification Search
CPC ............ B23K 35/0222; B23K 35/0244; B23K 35/025; B23K 35/36; B23K 35/3612; B23K 35/3613; B23K 35/3618; B23K 35/362
See application file for complete search history.

(56) References Cited

U.S. PATENT DOCUMENTS

| | | | |
|---|---|---|---|
| 2003/0121564 A1 | 7/2003 | Taguchi et al. | |
| 2004/0000355 A1 | 1/2004 | Suga et al. | |
| 2011/0036628 A1 | 2/2011 | Aihara | |
| 2011/0076607 A1* | 3/2011 | Sugimoto | G03G 9/0806 430/105 |
| 2015/0102090 A1* | 4/2015 | Arai | B23K 35/36 228/224 |

FOREIGN PATENT DOCUMENTS

| | | | |
|---|---|---|---|
| CN | 1422723 A | 6/2003 | |
| CN | 101327554 A | 12/2008 | |
| CN | 102990242 A | * 3/2013 | |
| CN | 102990242 A | 3/2013 | |
| JP | 62199289 A | 9/1987 | |
| JP | 10249577 A | 9/1998 | |
| JP | 2005152912 A | 6/2005 | |
| JP | 200615348 A | 1/2006 | |
| JP | 200643709 A | 2/2006 | |
| JP | 201382004 A | 5/2013 | |
| WO | 2007034758 A1 | 3/2007 | |
| WO | 2009104693 A1 | 8/2009 | |

* cited by examiner

*Primary Examiner* — Jenny R Wu
(74) *Attorney, Agent, or Firm* — The Webb Law Firm

(57) ABSTRACT

A purpose of the present invention is to provide a flux having an improved cleaning property by suppressing a carbonization of a flux residue. A flux contains an organic acid, a thixotropic agent, rosin and a solvent wherein a fatty acid monoalkylol amide having 14-20 carbon atoms is contained as the thixotropic agent. The fatty acid monoethanol amide is added in an amount of 3-10% by weight as the thixotropic agent. In addition, a dicarboxylic acid having 10 or less carbon atoms is added in an amount of 4-10% by weight as the organic acid. Moreover, the solvent is added in an amount of 30-60% by weight.

13 Claims, No Drawings

FLUX, SOLDER PASTE AND SOLDER JOINT

CROSS-REFERENCE TO RELATED APPLICATION

This application is the United States national phase of International Application No. PCT/JP2013/071779 filed Aug. 12, 2013, the disclosure of which is hereby incorporated in its entirety by reference.

TECHNICAL FIELD

The present invention relates to a flux in which carbonization based on heating when soldering is suppressed, a solder paste that is a mixture of the flux and solder alloy powder, and a solder joint that is formed by using the flux or the solder paste.

BACKGROUND

In general, a flux used for soldering has any efficiency in chemical removal of a metal oxide that resides at a solder alloy and a metal surface of a joint object to be soldered and in movement of metallic elements at a boundary therebetween. Therefore, by performing the soldering using the flux, an intermetallic compound can be formed between the solder alloy and the metallic surface of the joint object to accomplish a strong joint.

The solder paste is formed by mixing the flux and the solder alloy powder. In a process of soldering by using the solder paste, a jointed object such as electronic parts or the like is mounted on a joint object such as a substrate, an electrode or the like to which the solder paste is applied, and then both the joint object and the jointed portion are heated in a reflow furnace. The solder alloy in the solder paste is melted by heating the solder paste and then is solidified to join the joint object with the jointed object.

In the soldering process with the reflow furnace, it is necessary to prevent a void from occurring in the solder alloy that is melted and solidified thereafter. A technology has been previously proposed to reduce the voids by setting a heating time to be longer during the solder melting period (see, for example, Patent Document 1).

DOCUMENT FOR PRIOR ART

Patent Document

Patent Document 1: Japanese Patent Publication No. 2006-043709

SUMMARY OF THE INVENTION

Problems to be Solved by the Invention

The flux contains components which are not decomposed or volatilized by heating them in the process of soldering using the reflow furnace and they remain as flux residue. In a usage application of requiring removing the flux residue, it is necessary to remove certainly the flux residue with cleaning.

In the process of soldering using the reflow furnace, if the solder melting time is set to be longer, the voids can be reduced. However, a profile of keeping a peak temperature to meet the solder melting temperature for a predetermined time is difficult wherein such profile is that, for example, the peak temperature is set to be 240° C. and this peak temperature is kept for 30 seconds. In general, a method is used such that the peak temperature is raised and the temperature of 240° C. or more is kept for 30 seconds.

When the heating temperature for the solder melting period is increased, the voids are reduced whereas there is a possibility that the flux residue is carbonized. If the flux residue is carbonized, it is adhered to the joint object by soldering, such as the substrate, so that the flux residue cannot be removed by the cleaning.

The present invention is to resolve these problems and has an object to provide a flux that has an improved cleaning property by suppressing the carbonization of the flux residue, a solder paste that is a mixture of the flux and solder alloy powder, and a solder joint formed by using the flux or the solder paste.

Means for Solving the Problems

The inventors of the present application have found that the cleaning property of the flux residue can be improved by suppressing a carbonization of a compound that is added as a thixotropic agent to the flux.

The present invention is the flux that contains an organic acid, a thixotropic agent, rosin and a solvent wherein a fatty acid monoalkylol amide having 14-20 carbon atoms is contained as the thixotropic agent.

According to the flux of the present invention, it is preferable that one of a palmitic acid monoethanol amide and a stearic acid monoethanol amide or both of the palmitic acid monoethanol amide and the stearic acid monoethanol amide are added as the fatty acid monoalkylol amide in an amount of 3-10% by weight. In addition, it is preferable that a dicarboxylic acid having 10 or less carbon atoms is added as the organic acid in an amount of 4-10% by weight. Moreover, it is preferable that the solvent is added in an amount of 30-60% by weight.

According to the present invention, in the solder paste that is a mixture of the flux and the solder alloy powder, the flux contains the organic acid, the thixotropic agent, the rosin and the solvent wherein a fatty acid monoalkylol amide having 14-20 carbon atoms is contained as the thixotropic agent. Moreover, the present invention is a solder joint formed by using the aforementioned flux or solder paste.

Effects of the Invention

In the present invention, the fatty acid monoalkylol amide having 14-20 carbon atoms added as the thixotropic agent is not carbonized at a temperature equal to or less than 270° C. that is assumed in a surface mount soldering process called SMT (Surface Mount Technology). 270° C. means a heat-proof temperature for main components used for the SMT. Therefore, it is possible to remove the flux residue with the cleaning, so that the cleaning property for the flux residue can be improved.

EMBODIMENT FOR CARRYING OUT THE INVENTION

Composition Example of Flux According to Embodiment

A flux according to this embodiment contains an organic acid, a thixotropic agent, rosin and a solvent. The flux according to this embodiment is used as a solder paste by mixing with solder alloy powder.

The flux contains components that are not decomposed or volatilized by heating them in the process of soldering using the reflow furnace and the flux residue remains at a joint object by soldering, such as a substrate or the like. In a usage application of requiring removing the flux residue, it is necessary to certainly remove the flux residue with the cleaning.

On the other hand, in the soldering using the reflow furnace, it is necessary to suppress the voids in the solder alloy. Although the voids can be suppressed by raising the heating temperature in the soldering process, in the past, the compound, added as the thixotropic agent to the flux, could be carbonized and become the flux residue when raising the heating temperature during the soldering period.

When the flux residue is carbonized, it is adhered to the joint object by soldering, such as the substrate, and the flux residue cannot be removed by the cleaning. This phenomenon is called "sticking". If the sticking occurs, a quality thereof is reduced.

Thus, the cleaning property of the flux residue is improved by adding as the thixotropic agent the compound which can suppress the carbonization by a predetermined heat resistance against a temperature during the soldering process and can remove the flux residue by the cleaning.

In addition, the cleaning property of the flux residue can be also improved by staying the solvent component in the flux residue in accordance with the additive amount of the solvent.

The organic acid is added as an activator component for removing the metal oxide film. The organic acid is selected from the dicarboxylic acid having 10 or less carbon atoms, or specifically 4-9 carbon atoms (C4-C9) in this example. As the aforementioned organic acid, any one of azelaic acid, succinic acid, maleic acid, suberic acid and glutaric acid is added or a predetermined combination of azelaic acid, succinic acid, maleic acid, suberic acid and glutaric acid is added in consideration of the cleaning property. In this example, as the organic acid, a combination of the azelaic acid and the succinic acid or a combination of the azelaic acid and the maleic acid is added with a predetermined ratio thereof.

The thixotropic agent gives a desired thixotropy property to the solder paste to meet an intended use of the solder paste. The thixotropic agent is selected from compounds which have the heat resistance against the temperature during the soldering process using the reflow furnace and are soluble to a predetermined cleaning agent.

There is a fatty acid monoalkylol amide having 14-20 carbon atoms (C14-C20) as the thixotropic agent having the aforementioned properties. In this example, it is selected from the fatty acid monoalkylol amide having 16-18 carbon atoms (C16-C18). In the thixotropic agent, the fatty acid monoalkylol amide is added as a critical component, and a hardened castor oil and a fatty acid amide are arbitrarily added. The fatty acid monoalkylol amide is preferably one of the palmitic acid monoethanol amide and the stearic acid monoethanol amide or both of the palmitic acid monoethanol amide and the stearic acid monoethanol amide.

The rosin is selected from compounds that are soluble to a predetermined cleaning agent. In this example, it is one of polymerized rosin, hydrogenated rosin and disproportionated rosin or a predetermined combination of the polymerized rosin, the hydrogenated rosin and the disproportionated rosin.

The solvent dissolves solid components in the flux. The solvent is selected from generally known compounds of a glycol ether series.

The fatty acid monoalkylol amide added as the thixotropic agent is not carbonized at an assumed peak temperature in the furnace for the soldering process using the reflow furnace. Further, any of the fatty acid monoalkylol amide added as the thixotropic agent, the organic acid, the rosin and the solvent is selected from compounds that are soluble to the predetermined cleaning agent. Therefore, it is possible to remove the flux residue with the cleaning, so that the cleaning property for the flux residue can be improved.

When an additive amount of the organic acid is small in the flux, the solder wettability is reduced. On the other hand, when the additive amount of the organic acid is large therein, the solder wettability is improved. By improving the solder wettability, the occurrence of the voids can be suppressed.

However, when the additive amount of the organic acid is increased, the organic acid remains in the flux residue. This is a primary factor of carbonizing the flux residue, thereby causing a cleaning failure.

Therefore, the additive amount of the organic acid is set to be 4-10% by weight, that of the fatty acid monoalkylol amide as the thixotropic agent is set to be 3-10% by weight, that of the solvent is set to be 30-60% by weight and the remnant is the rosin.

By setting the additive amount of the solvent to be 30-60% by weight, a time until the solvent is perfectly volatilized can be extended in the soldering process using the reflow furnace. In other words, by increasing the additive amount of the solvent, the solvent component can remain in the flux residue. Since the solvent component, that prevents the flux residue from being solidified, remains in the flux residue, it is possible to improve the cleaning property for the flux residue.

Since the solvent remains in the flux, the flux also flows on a surface of the substrate or the like as the joint object and the metal oxide film can be removed. Therefore, even if the additive amount of the organic acid is 4-10% by weight, it is possible to improve the solder wettability without increasing the additive amount of the organic acid.

The solder paste of this embodiment is formed by mixing the flux of the aforementioned composition with the solder alloy powder. The solder paste of this example is formed by mixing the solder alloy powder and the flux wherein the composition of the solder alloy is Sn-3.0Ag-0.5Cu (each number shows % by weight). However, the present invention is not limited to this solder alloy.

The solder joint of this embodiment is formed by soldering with usage of the flux of the aforementioned composition and the solder alloy of any arbitrary composition or usage of the aforementioned solder paste.

Executed Example

The cleaning property of the flux residue and the voids in the solder alloy were verified by preparing the fluxes of the executed examples and comparison examples having compositions as shown in Table described hereinafter and using the fluxes of the executed examples and the comparison examples. Each composition ratio in Table 1 is represented by % by weight in the flux composition.

In order to verify the cleaning property of the flux residue and the voids in the solder alloy, the solder paste was formed by mixing the flux of the executed examples and the comparison examples in amount of 9% by weight with the solder alloy powder in amount of 91% by weight. Then, the solder paste was applied to a test object such as a metal plate or the like and the soldering operation was done in the reflow furnace.

The verification of the cleaning property was checked by visual contact existence or non-existence of the sticking flux residue after cleaning. The verification of the voids in the solder alloy was executed by applying the solder paste to the Cu plate and by mounting 10×10 (mm) Cu plate thereon to solder them in the reflow furnace. In this example, if an incidence rate of the voids is equal to or less than 1.0%, this is assumed to meet a desired void rate.

TABLE 1

|  | Executed Examples | | Comparison Examples | | |
| --- | --- | --- | --- | --- | --- |
|  | Executed Example 1 | Executed Example 2 | comparison example 1 | comparison example 2 | comparison example 3 |
| Rosin | 28% | 43% | 33% | 28% | 40% |
| Organic Acid | 5% | 7% | 12% | 5% | 2% |
| Thixotropic Agent | 7% | 5% | 15% | 5% | 8% |
| Organic Solvent | 60% | 45% | 40% | 60% | 50% |
| Amine |  |  |  | 2% |  |
| Cleaning Property | ○ | ○ | X | X | ○ |
| Voids | ○ | ○ | X | ○ | X |

As shown in the comparison examples of Table 1, in the comparison example 1 wherein the additive amounts of the organic acid and the thixotropic agent were more than 10% by weight respectively, this comparison example 1 did not meet the desired cleaning property and the desired void rate. In the comparison example 2 wherein the amine was added as an auxiliary activation, the solder wettability was improved and the void rate met the desired value; however, the sticking appeared and the desired cleaning property could not be obtained. Therefore, it was found that the addition of the amine affected the cleaning property for the flux residue. Moreover, in the comparison example 3 wherein the additive amount of the organic acid was 2% by weight, there was no sticking and the desired cleaning property was obtained; however, the void rate did not meet the desired value.

On the other hand, in the executed examples 1 and 2 wherein the additive amount of the organic acid was 4-10% by weight and that of the fatty acid monoalkylol amide as the thixotropic agent was 3-10% by weight, it was found that the sticking was not seen and the desired cleaning property was satisfied. In addition, it was found that the void rate met the desired value.

From the above verification result, it was found that any carbonization of the flux residue was suppressed by heating when soldering in the case that the amine was not added and the fatty acid monoalkylol amide was added in the amount of 3-10% by weight as the thixotropic agent.

INDUSTRIAL APPLICABILITY

The present invention is applied to the soldering operation using the solder paste.

The invention claimed is:
1. A flux, comprising:
an organic acid;
a thixotropic agent;
rosin; and
a solvent
wherein a fatty acid monoalkylol amide having 14-20 carbon atoms is contained as the thixotropic agent.
2. The flux according to claim 1, wherein one of a palmitic acid monoethanol amide and a stearic acid monoethanol amide or both of the palmitic acid monoethanol amide and the stearic acid monoethanol amide are added as the fatty acid monoalkylol amide in an amount of 3-10% by weight.
3. The flux according to claim 2, wherein a dicarboxylic acid having 10 or less carbon atoms is added as the organic acid in an amount of 4-10% by weight.
4. The flux according to claim 2, wherein the solvent is added in an amount of 30-60% by weight.
5. A solder paste, comprising a mixture of the flux recited in claim 1 and solder alloy powder.
6. The flux according to claim 3, wherein the solvent is added in an amount of 30-60% by weight.
7. A solder paste, comprising a mixture of the flux recited in claim 2 and solder alloy powder.
8. A solder paste, comprising a mixture of the flux recited in claim 3 and solder alloy powder.
9. A solder paste, comprising a mixture of the flux recited in claim 4 and solder alloy powder.
10. A solder joint formed by using the solder paste recited in claim 5.
11. A solder joint formed by using the solder paste recited in claim 7.
12. A solder joint formed by using the solder paste recited in claim 8.
13. A solder joint formed by using the solder paste recited in claim 9.

* * * * *